(12) United States Patent
Laduke et al.

(10) Patent No.: US 9,625,732 B1
(45) Date of Patent: Apr. 18, 2017

(54) REFLECTIVE SURFACE TENSIONING SYSTEM FOR PEPPER'S GHOST ILLUSION

(71) Applicant: DISNEY ENTERPRISES, INC., Burbank, CA (US)

(72) Inventors: Thomas F. Laduke, Orange, CA (US); Mark A. Reichow, Glendale, CA (US); Mason Daryl Lev, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/006,437

(22) Filed: Jan. 26, 2016

(51) Int. Cl.
| | |
|---|---|
| *G03B 21/56* | (2006.01) |
| *G03B 21/606* | (2014.01) |
| *G02B 27/22* | (2006.01) |
| *G02B 7/182* | (2006.01) |
| *G03B 21/28* | (2006.01) |

(52) U.S. Cl.
CPC ......... *G02B 27/2292* (2013.01); *G02B 7/182* (2013.01); *G03B 21/28* (2013.01); *G03B 21/56* (2013.01); *G03B 21/606* (2013.01)

(58) Field of Classification Search
CPC ........ G03B 21/56; G03B 21/58; G03B 21/60; G03B 21/606; Y10S 248/917
USPC ................. 359/478, 479, 461, 443
See application file for complete search history.

(56) References Cited

U.S. PATENT DOCUMENTS

| | | | | |
|---|---|---|---|---|
| 4,406,519 A | * | 9/1983 | Shaw ..................... | G03B 21/58 160/328 |
| 5,865,519 A | * | 2/1999 | Maass ..................... | A63J 5/021 353/28 |
| 6,844,993 B2 | | 1/2005 | Fujimori et al. | |
| 7,152,979 B2 | | 12/2006 | Ellis et al. | |
| 8,358,928 B2 | | 1/2013 | Appel et al. | |
| 8,888,295 B2 | * | 11/2014 | Edwards ................ | G03B 21/16 353/57 |
| 2001/0026402 A1 | | 10/2001 | Gerhard et al. | |
| 2009/0273760 A1 | | 11/2009 | Itoh | |
| 2011/0141562 A1 | | 6/2011 | Okazawa et al. | |
| 2011/0164224 A1 | | 7/2011 | Nishihata et al. | |
| 2011/0261450 A1 | * | 10/2011 | Howes ................... | G03B 21/56 359/443 |

* cited by examiner

*Primary Examiner* — William C Dowling
(74) *Attorney, Agent, or Firm* — Marsh Fischmann & Breyfogle LLP; Kent A. Lembke

(57) ABSTRACT

An apparatus, such as a Pepper's ghost system, for displaying images. The apparatus includes a projection assembly projecting an image stream and a tensioning assembly supporting a reflective element such as a polyester film. The tensioning assembly includes first and second edge retention assemblies retaining, respectively, a first edge of the reflective element and a second edge of the reflective element opposite the first edge. The tensioning assembly includes a tension adjuster applying tensile forces at spaced apart locations along the first edge of the reflective element. The first edge of the reflective element is serrated such as with a plurality of spaced apart slots that may be shaped as a partial oval. The first edge retention assembly includes a pair of retention plates with the first edge sandwiched therebetween. The first edge retention assembly includes fasteners passing through slots to couple the first and second plates together.

27 Claims, 15 Drawing Sheets

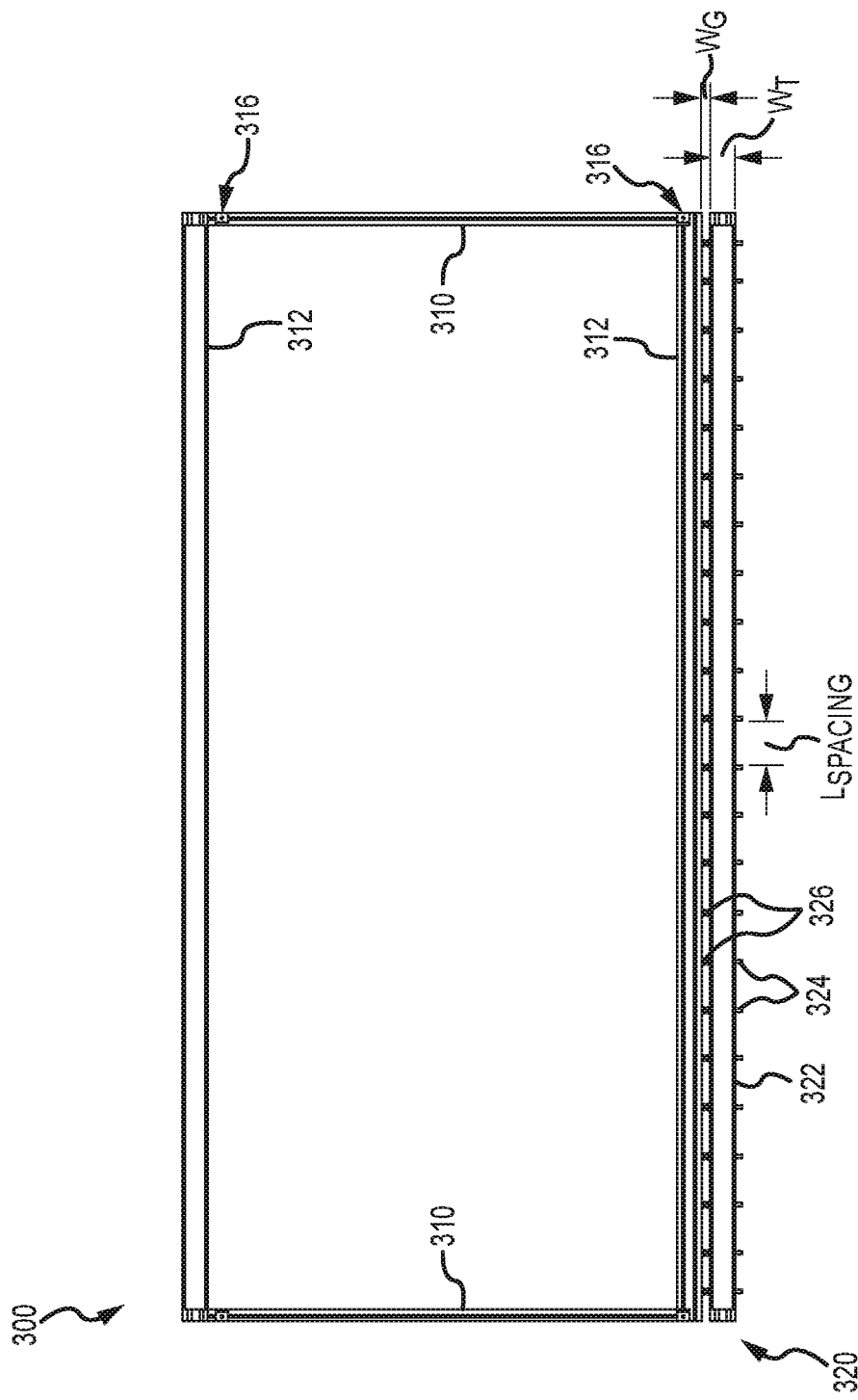

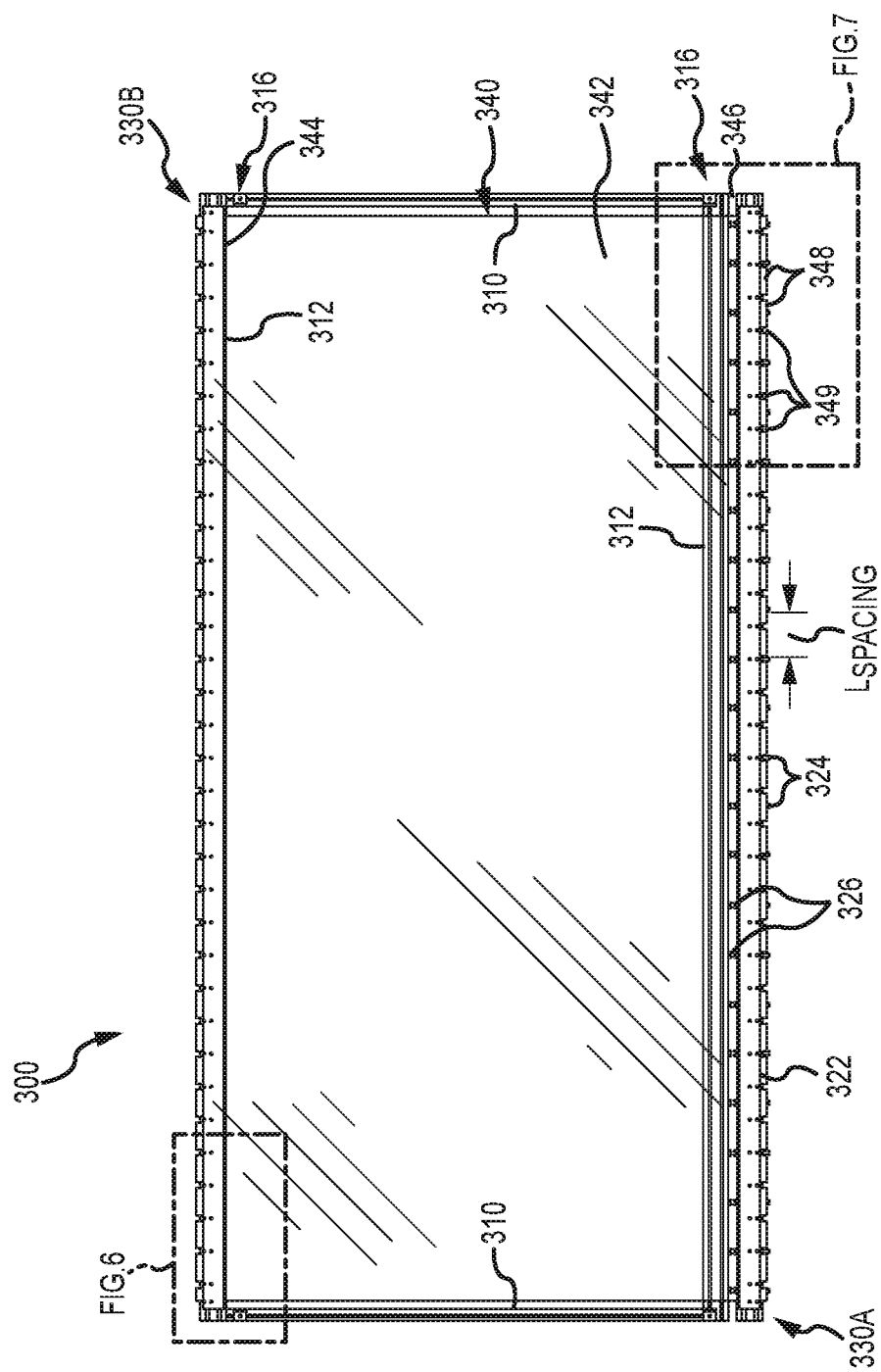

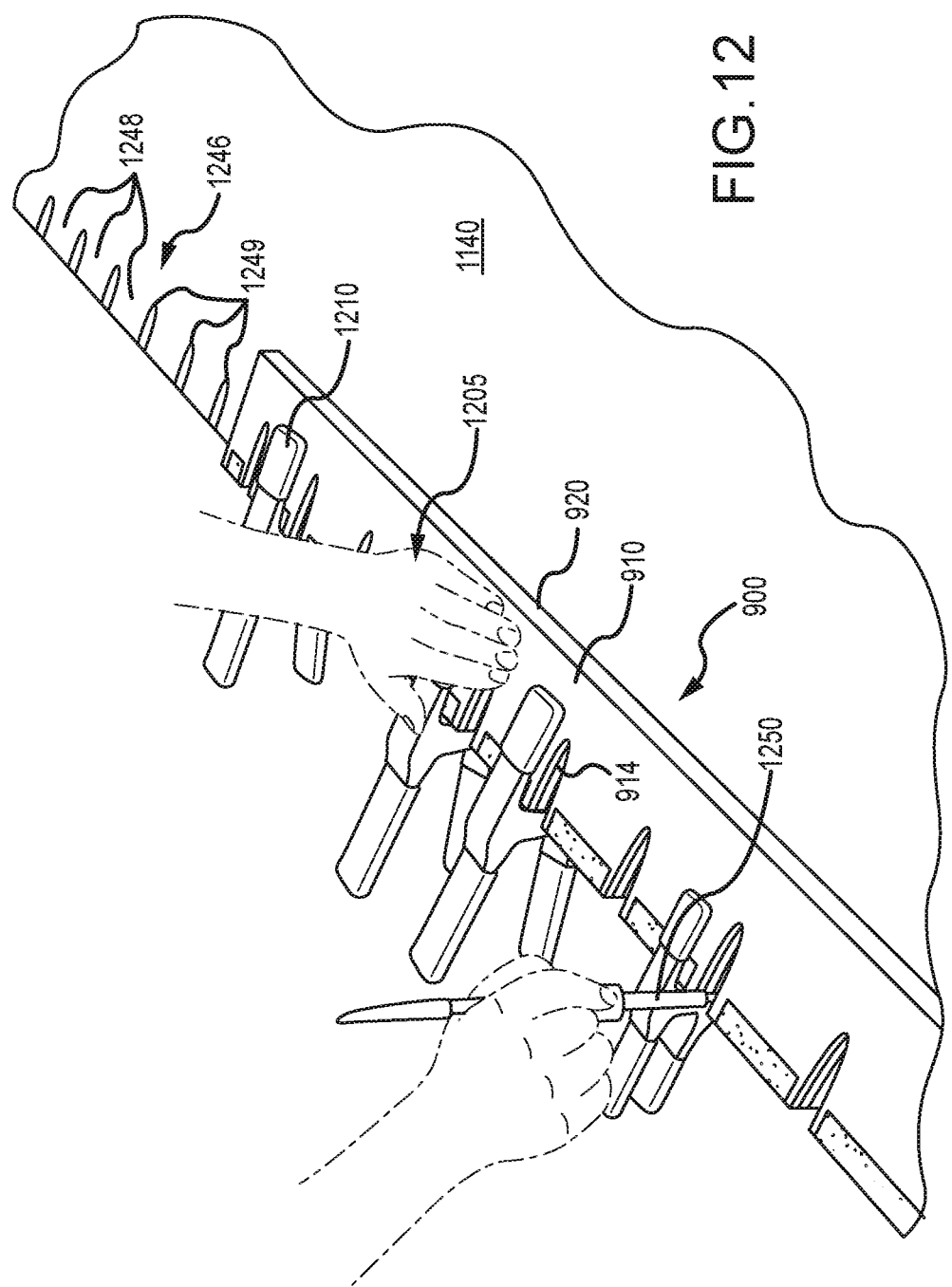

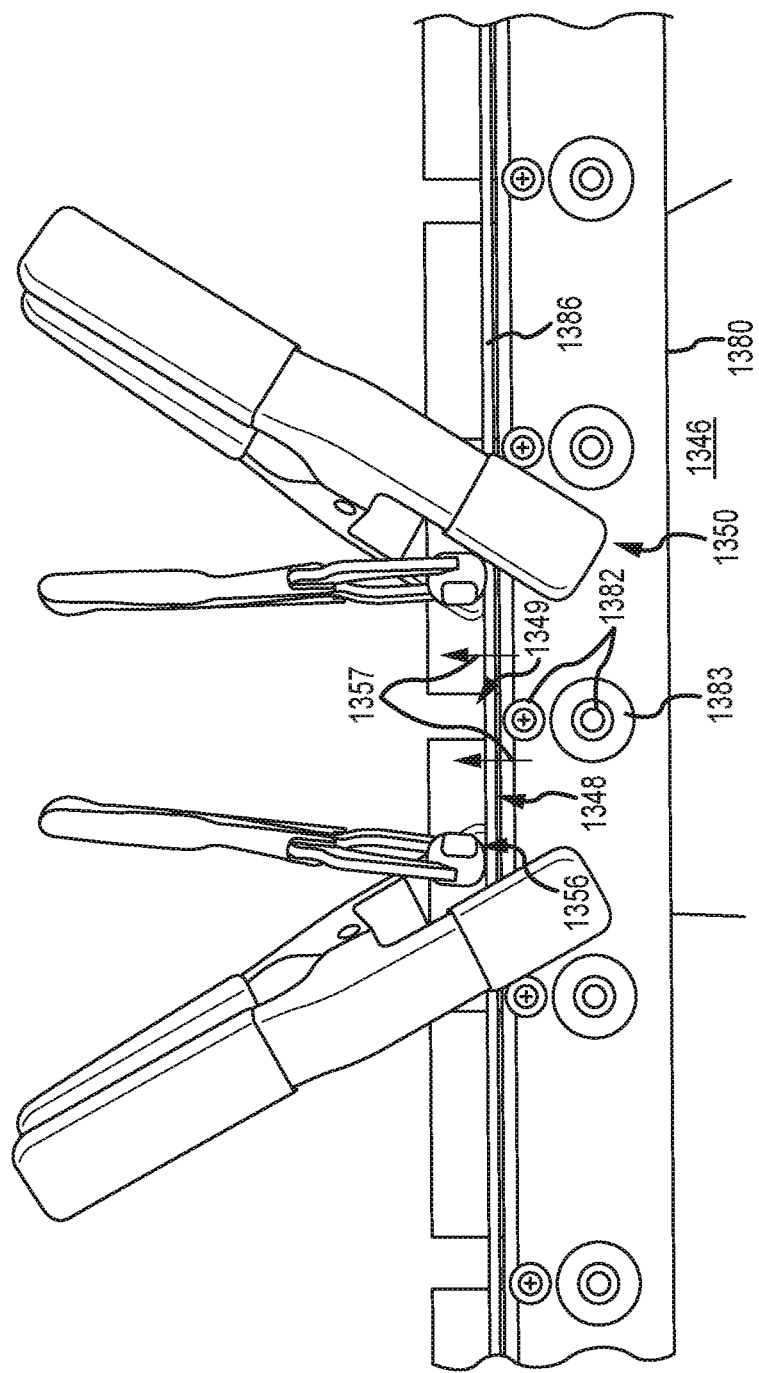

REFLECTIVE SURFACE TENSIONING SYSTEM FOR PEPPER'S GHOST ILLUSION

BACKGROUND

1. Field of the Description

The present invention relates, in general, to projecting or displaying the illusion of video/animated or still three dimensional (3D) images, and, more particularly, to autostereoscopic projection systems such as those adapted to display ghost or latent 3D images as provided as part of a Pepper's ghost illusion.

2. Relevant Background

There are numerous entertainment and other settings where it is desirable to create a unique visual display. For example, theme or amusement parks may include rides or walk-through attractions where guests (or "viewers") are entertained by a unique visual effect or illusion. Often, engineering challenges arise in fabricating and installing the display or projection system.

Pepper's ghost is an illusionary technique used by magicians, theatrical designers, ride or attraction designers, and others to produce a 3D illusion of a latent or ghost-like image. Using a reflective and transmissive element (e.g., a simple piece of reflective plate glass or a transparent polyester thin film) and special lighting techniques, Pepper's ghost systems can make objects appear and disappear within a scene or room. Generally, these systems include a main room or scene that is readily viewed by a guest or viewer and also include a hidden room that is not visible to the viewer. Both rooms may be identical in their physical structure including furniture and other objects except that the hidden room may include additional objects or characters such as a ghost. A large piece of glass, a half-silvered mirror, or other reflective element (e.g., a flexible sheet of polyester such as a polyethylene terephthalate (PET), a Mylar®, or the like) is situated between the viewer and the scene at an angle of 45 degrees. When the main room is lit and the hidden room is darkened, the viewer only sees the main room as the hidden room does not reflect from the glass, which is itself hard to see as it typically extends across the entire view of the main room and is transparent (at least in part) to allow viewing of the room behind the glass (or reflective element).

Pepper's ghost becomes visible to the viewer when the entire hidden room or portions, such as a "ghost" or other character, are brightly lit. Since only a portion of the light cast upon the ghost or other objects in the hidden room is reflected from the glass, the reflected images appear as latent or ghostly images relative to the objects in the main room (e.g., the reflected images or images superimposed in the visible room may appear to float). The Pepper's ghost image appears to be a 3D image that may be still or animation may be provided such as with animatronics or by placing a live actor in the hidden room. In some other implementations, the hidden room may be replaced by a projection assembly that projects a still or animated image onto a screen, such as a rear projection screen. Images on this projection screen (which is hidden from view from the viewer) are reflected from the glass or reflective element (or reflective surface of the reflective element which may be a half-silvered mirror or a flexible material (e.g., a polyester film such as a sheet of Mylar®) with similar optical qualities to provide a reflective surface).

When a flexible film or sheet of material (e.g., polyester) is used, the film needs to be tensioned (and held under tension during use) so that the reflective surface is optically flat. Some existing tensioning devices or assemblies require complex and cumbersome attachment hardware, and existing Pepper's ghost systems may require a large truss section to support just the tensioning device/assembly. Many tensioning assemblies rely upon compression sandwich-style plates to squeeze the film positioned between the films so that the film will be retained in the tensioning assembly without slipping out and while attempting to apply adequate tension forces to the film, both functions can be difficult to achieve and maintain in such assemblies. Other tensioning assemblies may require holes to be cut in the film for fasteners, which can limit any later desired lateral adjustments in tension and which can lead to tearing or cutting of the film as tension is applied or the film retained in place under tension. Still other assemblies may use abrasive surfaces on mating surfaces to grab onto the film and resist its movements, but, again, this can cause damage to the film and/or does not support localized adjustment of the tension along the length of the plates (e.g., have to mate the edge of the film with the abrasive surfaces of sandwich-style plates and then move the plates as a whole to adjust tension). While the industry has used these designs in the past and in current Pepper's ghost systems, there is continued dissatisfaction with features of each of these tensioning assemblies and/or techniques for flexible reflective elements (e.g., Mylar® sheets or the like).

Hence, there remains a need for improved designs for systems or assemblies for providing the Pepper's ghost illusion that provide high quality imagery over long time periods that are easy to maintain and install. Preferably such systems would be designed to simplify the attachment and tensioning process for a reflective element formed of a flexible polyester film/sheet, and the systems also preferably are useful for applying consistent tension on the film or reflective element.

SUMMARY

The present invention addresses the above problems by providing a Pepper's ghost system (or display (or projection) system) adapted particularly to assist manufacturers and installers of the system to apply a desirable amount of tension to the flexible reflective element (e.g., to a sheet or film of plastic, polyester, PET, Mylar®, or the like). The reflective element is formed, typically, of a thin (e.g., 0.25 to 3 mils) film of reflective material, which is chosen to have qualities allowing it to appear transparent to items behind it but also to reflect from a front or viewer-side surface exposed to a projection assembly (which may include a projector projecting animated or still images or may include a space with a character(s) and/or objects illuminated with one or more lights). The Pepper's ghost system is adapted to provide improved or more effective installation, maintenance, and sustainability or life of the system when installed and operated on an ongoing basis. The reflective element is formed, in this case, from a flexible material or sheet of reflective material and preferably is tensioned to make the illusion of Pepper's ghost imagery display accurately or desirably. For example, it may be desirable that enough tension or tensile forces be applied to the reflective element to cause it to be planar or substantially planar (e.g., little or no sag across the reflective surface used to reflect the projected imagery from the projection assembly).

To this end, the system includes a tensioning assembly (or sometimes labeled the reflective element assembly) that supports the reflective element at a desired display angle and tensions the sheet of reflective material to provide a planar reflective element. Proper tensioning (a tensile force great enough to make the sheet material taut across its surface) of the reflective surface is accomplished in one embodiment by processing the reflective element (e.g., a PET film or the like) to have the tensioning edge serrated. The tensioning edge of the reflective element may be cut into a repeating series of spaced-apart recesses that may be ovoid (or partial or half oval) in shape.

These ovoid-shaped (e.g., half ovals) recesses leave room for attachment screws of an edge retention assembly to pass through the reflective element without penetrating it. In current Pepper's ghost systems, some tensioning techniques require perforated holes to penetrate the film so that the screws may pass through the film, but, under tension, misaligned holes cause unequal tension that results in film distortion. In contrast, the ovoid-shaped slots or recesses in the film (or reflective element) edge (i.e., "tensioning edge" or "tensioning side") leave space or room for minor lateral adjustments during the tensioning process/method. In this way, the tensioning assembly requires less precision in manufacture of the assembly's components and in their assembly in the field than the hole perforation (or hole and screw) technique, which simplifies assembly and surface preparation. Additionally, the use of a serrated tensioning edge also eliminates stress tears that can occur under tension when using the prior hole and screw technique.

More particularly, an apparatus is provided that is configured for projecting or displaying images to a viewer in a viewing space (e.g., a Pepper's ghost system). The apparatus includes a projection assembly projecting an image stream and a tensioning assembly supporting a reflective element (e.g., a sheet of flexible material such as a polyester film). The tensioning assembly includes first and second edge retention assemblies retaining, respectively, a first edge of the reflective element and a second edge of the reflective element opposite the first edge. Additionally, the tensioning assembly includes a tension adjuster operable to separately apply a tensile force at a plurality of locations along the first edge of the reflective element, whereby the reflective element is taut and the first and second surfaces are planar. In many preferred embodiments, the first edge of the reflective element is serrated such as with a plurality of spaced apart slots. The slots each may be shaped as a partial oval (e.g., to be ovoid or to have smooth edges defining half of an oval).

In some embodiments, the first edge retention assembly may include a pair of retention plates. Then, the first edge can be sandwiched between the retention plates. The first edge retention assembly may further include fasteners coupling the first and second plates together and such fasteners may extend through the slots in the first edge. In practice, the serrated first edge may include a plurality of protruding portions (or "flags") between each adjacent pair of the slots, and each of the protruding portions extends outward a distance from an outer side of each of the retention plates to allow lateral alignment and tension adjustments to be made at each protruding portion of the first edge.

The tensioning assembly further may include a frame with at least first and second frame arms. Then, the tension adjuster may include a tensioning beam rigidly attached to the first plate of the first edge retention assembly and coupled to the first frame arm with a fastener assembly including a plurality of spaced apart fasteners. To provide tension adjustment, the fastener assembly is operable to adjust spacing between the first frame arm and the first plate at each of the fasteners, whereby a tensile force applied to the reflective element is adjustable along the first edge at locations of each of the fasteners. The tensioning beam and first plate each may include a plurality of separate sections that are independently positionable within the tensioning assembly.

In other embodiments, the first and second edge retention assemblies each includes a pair of elongate magnetic members and the first edge is sandwiched between the magnetic members. In yet other embodiments, the first edge includes a plurality of spaced apart straps affixed to the first edge and extending outward from the sheet. In these embodiments, the tension adjuster may include a plurality of force application components each connected to one of the straps and operable to apply a localized tensile force to the sheet via the connected one of the straps.

BRIEF DESCRIPTION OF THE DRAWINGS

FIGS. 3A-3C illustrate, respectfully, a top plan view of a tensioning assembly prior to installation of a flexible reflective element, a side view of the tensioning assembly of FIG. 3B after insertion of a flexible reflective element, and a top plan view of the tensioning assembly of FIGS. 3A and 3B showing additional details including the edge retention assemblies, the reflective element, the top capture plates, and the use of serrated edges on the reflective element;

FIG. 12 illustrates a cutting (or material removal) step in the process of forming a reflective element with at least one serrated edge (e.g., the tension adjusting edge); and FIG. 13 illustrates a tension adjusting step in a process of tension adjustment for a reflective element in a tensioning assembly for use in a Pepper's ghost or display/projection system of the present description.

DETAILED DESCRIPTION

Briefly, a Pepper's ghost system is provided that is adapted to facilitate positioning a flexible reflective element in a non-vertical position, e.g., an angle of 30 to 60 degrees from vertical. Use of a flexible film such as a large sheet of polyethylene terephthalate (PET) film as the beam splitter or reflective element of the Pepper's ghost system requires that the reflective element be tensioned so as to provide a substantially planar reflective surface (e.g., the bottom surface of the reflective element). To this end, the Pepper's ghost system provides a reflector system with a tensioning assembly that is adapted to allow effective and easily repeated tensioning by applying a tensile force along one edge or side of the reflective element (e.g., threaded movement of a clamp holding the edge/side without puncturing the material of the reflective element).

Figure 1:
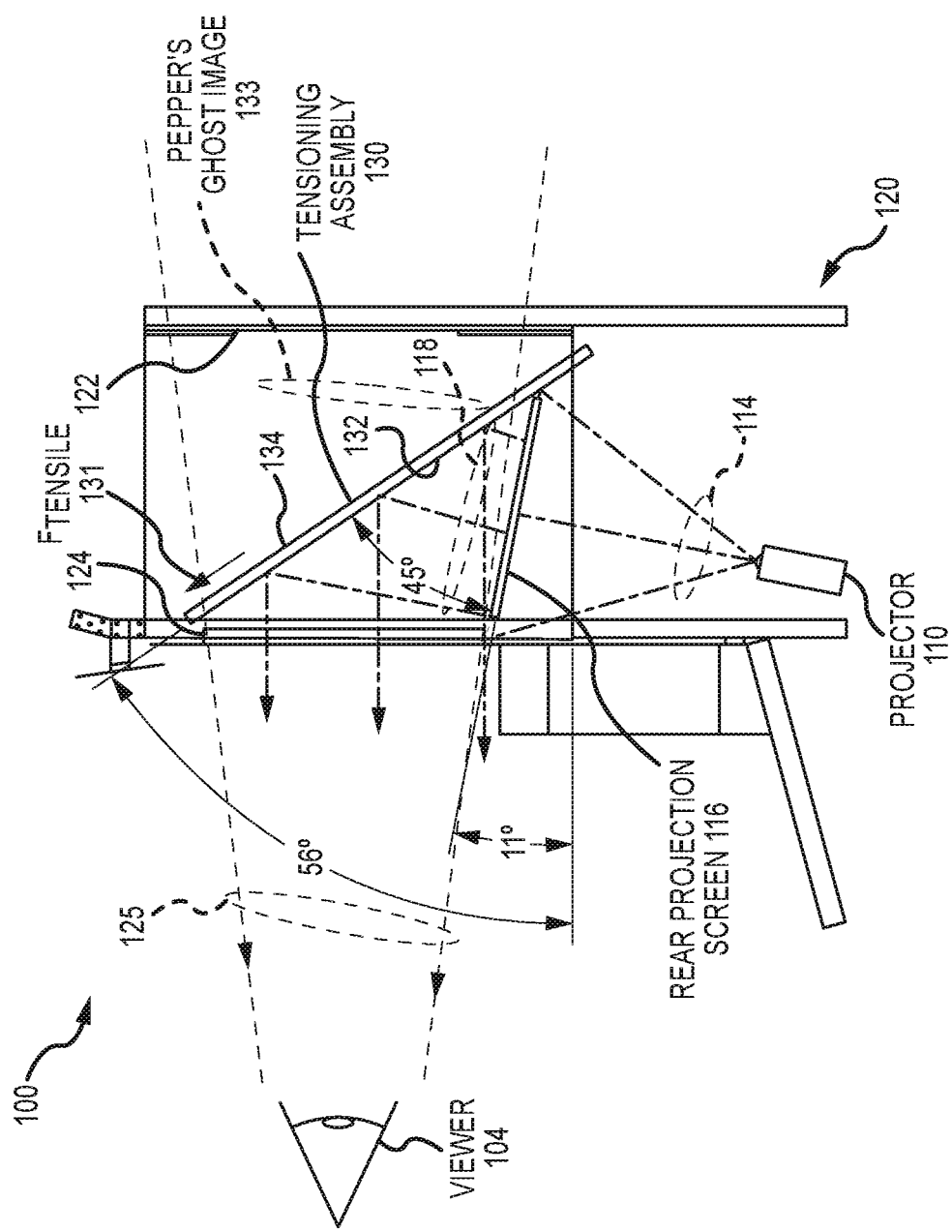
FIG. 1 illustrates a side view of a Pepper's ghost system of one embodiment of the description showing use of a tensioning assembly to position a flexible reflective (and transmissive) element at a display angle off of vertical (e.g., 45 degrees from a projection screen or the like)

FIG. 1 provides a side view of an exemplary Pepper's ghost (or display or projection) system 100 in which the present tensioning method may be implemented. The system 100 includes a projector assembly 110 that in this implementation is shown to include a projector projecting a still or animated/video image 114 onto a rear projection screen 116, but other embodiments may provide a "projector" assembly 110 that includes a space/room with a character and/or objects that are selectively illuminated to provide the images 114 (e.g., without use of a projection screen 116). Further, the system 100 is shown to include an external framing assembly 120 that generally is configured to enclose, support, and/or hide from a viewer 104 the projector assembly 110 and the projection screen 116. The framing assembly 120 includes a viewing window 124 in a front wall and a background image element 122 (e.g., an LCD or other display, room scenery, painted or other artwork, and the like).

The system 100 further includes a tensioning assembly 130, which as explained below, includes a reflective element (e.g., a sheet of Mylar® (or BoPET), PET, polyester, plastic, or the like) with a first surface 132 facing the projection screen 116 at an offset angle (e.g., 45 degrees) that is also visible to the viewer 104 through the window 124. The reflective element also includes a second surface 134 facing away from the viewer 104 and toward the image element 122. These components work together to provide a Pepper's ghost effect. Briefly, during operation of the system 100, the projector assembly 110 projects the image 114 on the RP screen 116, which provides a projected image 118 that strikes the first surface 132 of the reflective element in the tensioning assembly 130. The reflective (or reflector) element is transparent to some light (such as when viewed directly by the viewer 104) but also reflects light received at an angle (such as 30 to 60 degrees with 45 degrees being commonly used and shown) as shown with light of projected image 118. The projected image 118 light strikes a first or bottom surface (or reflective surface) 132 and is reflected as a Pepper's ghost image 133 through the window 124 to the viewer 104 (e.g., a portion of the light of image 118 is reflected in image 133 such as about 50 percent intensity from 116). Concurrently, the viewer 104 is able to see reflected light 125 from the background image element 122 that passes through the second or back surface 134 of the reflective element in the tensioning assembly 130 to provide the desired optical effect.

Figure 2:
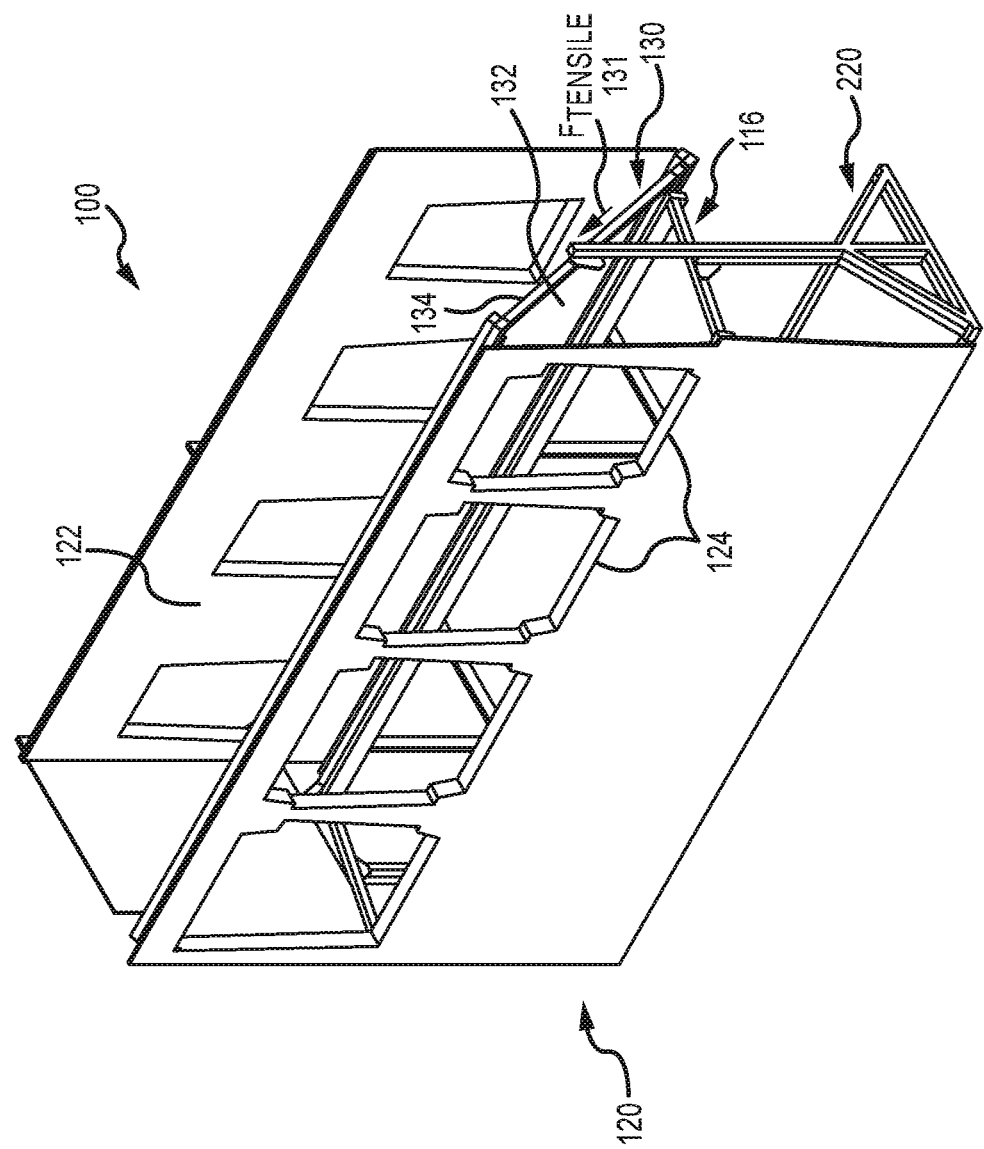
FIG. 2 is an isographic view of the Pepper's ghost system of FIG. 1 showing additional and/or different details.

FIG. 2 illustrates the Pepper's ghost system 100 with a 3/4 isographic view. The projector assembly 110 is not shown for simplicity sake and to facilitate illustration of the internal frame/support assembly 220 that is utilized to physically support the RP screen 116 and also the tensioning assembly 130 relative to the external walls. A viewer can look through the windows 124 to see reflected light from the surfaces/background image element 122 that strikes the back surface 134 of the reflective element (which is chosen to be formed of a material that is both transmissive to this type of light and also reflective of light at certain angles). Concurrently, the viewer is able to view light from the RP screen 116 that is projected up toward the angled surface 132 of the reflective element to provide a ghostly/latent 3D image (or "Pepper's ghost").

To achieve this optical effect, though, the tensioning assembly 130 needs to be configured to adequately tension the reflective element with tensile forces as shown with arrow 131 in FIGS. 1 and 2 (note, though, it often is desirable to apply differing tensile or stretching forces at various points along the length of the tensioning edge of the reflective element) to cause the thin film to be adequately taut throughout its exposed surface area. This can be a difficult challenge when working with large sheets or films of plastic, PET, polyester, and the like, e.g., the reflective element may be 4 to 12 feet on each side which can make it difficult to provide uniform "tautness" over the reflective surfaces of this element.

Figure 3B:
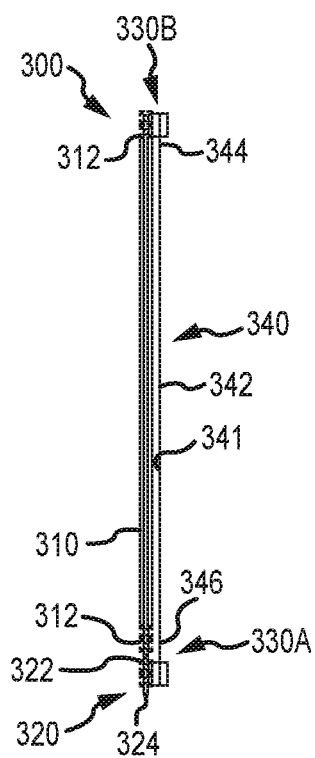

FIGS. 3A-3C illustrate, respectfully, a top plan view of a tensioning assembly 300 prior to installation of a flexible reflective element, a side view of the tensioning assembly of FIG. 3B after insertion of a flexible reflective element 340, and a top plan view of the tensioning assembly of FIGS. 3A and 3B showing additional details including the edge retention assemblies 330A, 330B (with top capture plates) and use of serrated edges 344, 346 on the reflective element 340. The tensioning assembly 300 may be used within a Pepper's ghost system (or display or projection system) such as for the tensioning assembly 130 in the system 100 of FIGS. 1 and 2.

As seen in FIG. 3A, the tensioning assembly 300 includes a pair of spaced-apart side frame arms or struts 310 and also a pair of spaced-apart end frame arms or struts 312. These four elongated members 310, 312 define a rectangular support frame for a reflective element (e.g., the flexible and transparent sheet or film 340 shown in FIGS. 3B and 3C), and these arms or struts 310, 312 are typically rigid rods or beams selected to be strong but lightweight (e.g., aluminum or other metal channel-type components, which may optionally be provided as a T-slotted framing system such as that provided by 80/20° Inc. or other manufacturers/distributors of building components/systems or may take other forms to practice the tensioning assembly 300). These arms or struts 310, 312 generally define the shape and size (maximum width with arms 310 and maximum length with arms 312) of a window through which light may be transmitted and reflected to a viewer from surfaces of the reflective element.

FIG. 3A also shows that the tensioning assembly 300 includes a tension adjuster (or tension adjuster assembly or apparatus) 320, which functions to securely retain opposite edges or sides of a flexible reflective element and also to allow one edge (a tension adjusting edge) to be pulled or drawn a distance away from the opposite edge so as to apply tension to the reflective element to make it uniformly taut to force it to be planar or at least substantially planar. In FIG. 3A, a tensioning rod or beam 322 is shown that has a width, WT, (e.g., a width matching that of mating sandwiching members of the edge retention assemblies 330A and 330B shown in FIG. 3B) and shown run parallel to the proximate or adjacent end arm 312. The tensioning rod or beam 322 is spaced apart a distance, WG, or a gap from the proximate or adjacent end arm 312, and it may take a similar or different form as the nearby arm 312 such as an aluminum channel member (e.g., a T-slotted frame member available from 80/20® Inc. or other distributors).

This adjustable distance, WG, or variable gap allows the reflective element to be stretched or made taut with tensile forces because this distance, WG, can be adjusted by operation of the tension adjuster 320. Specifically, the tensioning rod or beam 322 is coupled via a plurality of fasteners (e.g., threaded bolts or shafts) 324 that are each spaced apart a predefined distance, $L_{Spacing}$, such as 4 to 12 inches or the like with 6 inches used in one implementation, and an adjustable member 326 such as a hex nut or the like is placed over the fastener and allowed to be rotated/moved so as to defined the gap width, WG, proximate to each of the spaced apart fasteners 324. In this manner, tensile forces that may be the same or different can be applied at each of the fasteners 324 (or at space apart locations) along the length of the tensioning rod or beam 322 by affixing one of the edge retention assemblies 330A to the tensioning rod or beam 322 and positioning and retaining one edge (the tension adjustment edge 346) of the flexible reflective element in this assembly 330A (e.g., the retention assembly 330A moves with the tensioning rod 322 which can be used to adjust how much tensile force is applied to the reflective element at the location of each fastener 324).

FIG. 3B shows the tensioning assembly 300 after further assembly to include a flexible reflective element 340 (e.g., a sheet or film of plastic, polyester, PET, BoPET, or the like) with first and second surfaces 341, 342. Tension is applied to cause these surfaces 341, 342 to be planar (or nearly so) to assist in creating a Pepper's ghost effect or other optical effect. Particularly, a first edge retention assembly 330A is rigidly coupled to the tensioning rod 322 so as to move with this rod 322 in the tensioning assembly 300, and a first edge or side (e.g., a tension adjustment edge) 346 of the reflective element 340 is retained by the first edge retention assembly 330A.

A second edge retention assembly 330B is rigidly coupled to the side frame arm or strut 312 opposite the tensioning rod 322 and nearby side frame arm or strut 312, and a second edge or side 344 of the reflective element 340 is retained by the second edge retention assembly 330B. In typical operations of the assembly 300, once the edge 344 is captured by the second edge retention assembly 330B, it is not further adjusted or moved within the retention assembly 330B, which is itself stationary in the assembly 300. Hence, movement of all or portions of the tensioning rod 322 causes tensile forces applied to the reflective element to be increased or reduced as it causes the two edges 344, 346 of the reflective element 340 to be moved closer or further apart.

FIG. 3C illustrates the tensioning assembly 300 of FIGS. 3A and 3B in top view from the opposite side as shown in FIG. 3A. In FIG. 3C, the flexible reflective element 340 is shown to have a planar exposed surface 342 and shown to have a first edge 346 captured or retained by the first edge retention assembly 330A and a second opposite edge 344 capture or retained by the second edge retention assembly 330B. FIG. 3C also shows that both edges 344 and 346 are serrated through the inclusion of a plurality of spaced apart (typically equally spaced apart a predefined distance such as a distance in the range of 2 to 12 inches with a spacing (between proximate sides) of 3 to 4 inches used in some embodiments) recesses or slots 349, which, in turn define a plurality of protruding portions or flags 348 between these slots 349. Fasteners of the edge retention assemblies 330A and 330B pass through reflective element 340 via these slots so there is no perforation of the element 340 and so there can be some relatively small (e.g., less than 0.25 to 1.0 inches) amount of lateral adjustment or alignment along the length of the tensioning rod or beam 322 during installation and tensioning of the reflective element 340 in the tensioning assembly 300. The flags or protruding portions 348 are useful for allowing an operator of the assembly 300 to apply additional tension at a particular location along the tensioning beam 322 and tension adjusting edge 346 of the reflective element 340 such as to make localized tensile adjustments to remove any distorted regions in the surface 342 (e.g., to better obtain uniform planarity in the reflective element 340).

Figure 4:
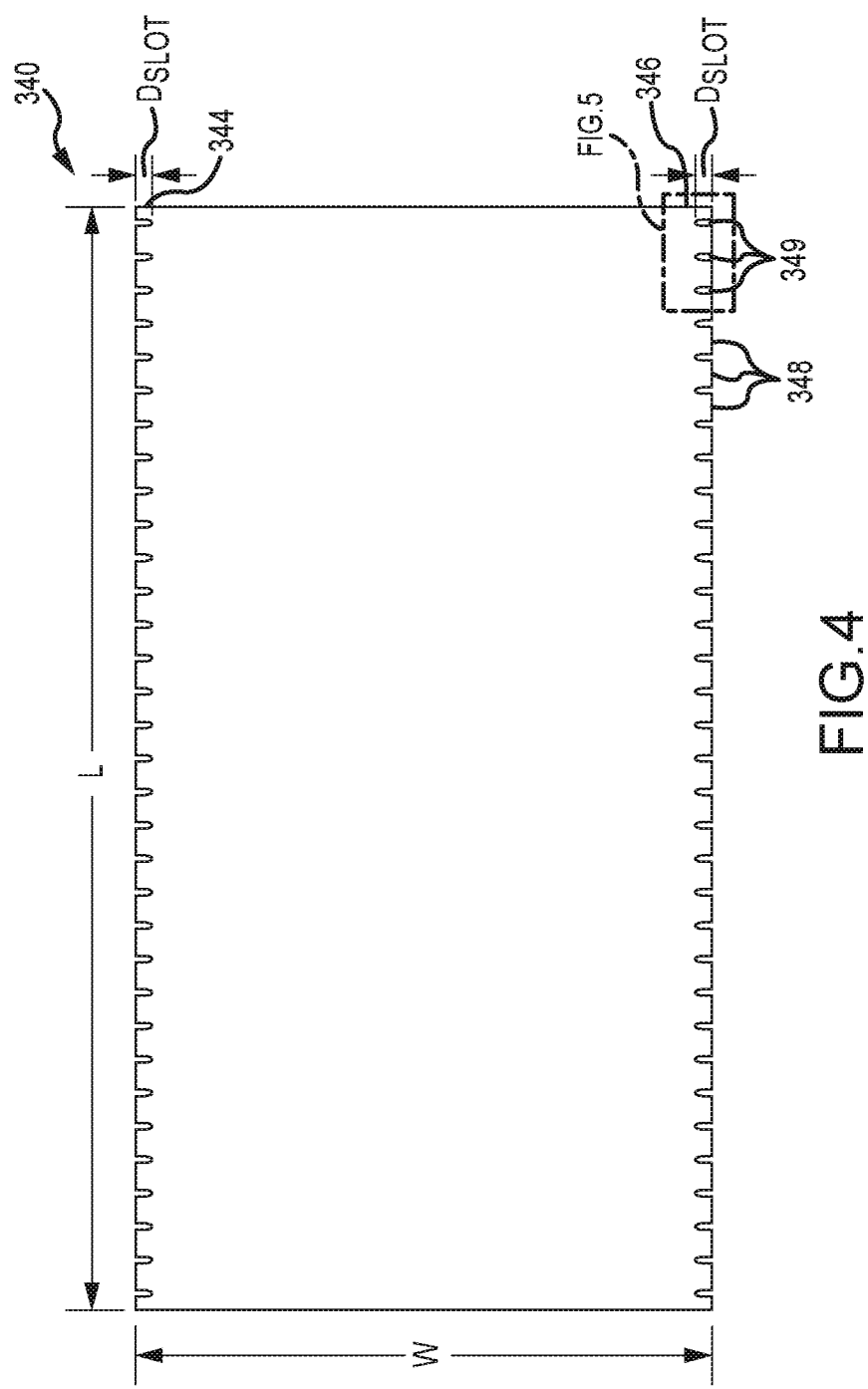
FIG. 4 is a plan view of the flexible reflective element of FIGS. 3B and 3C.

FIG. 4 provides a plan view of the reflective element 340 that may be used in the tensioning assembly 300 as shown in FIGS. 3B and 3C. The reflective element 340 may take the form of a thin sheet or film of transparent and transmissive plastic, polyester, PET, BoPET (e.g., Mylar®), or the like and have a width, W, and length, L, useful for a particular display system design (e.g., a width, W, of 3 to 8 feet and a length, L, of 5 to 12 feet). As discussed above, a pair of opposite edges/sides 344, 346 of the reflective element is retained in edge retention assemblies, and tensile forces are applied along lines adjoining these sides by moving one of the two edges (e.g., edge 346 in this example) while holding the other edge still or in place in the assembly 300 (e.g., edge 344 may be retained to be stationary).

A plurality of slots or recesses 349 are provided at least in the edge 346 used for tension adjustments (while they may be provided in both edges as shown with edge 344 to reduce the risk of damaging the edge 344 with hole and screw or frictional type retention devices). The slots/recesses 349 have a depth chosen, in part, to provide space for fasteners of an edge retention assembly to pass through the film/sheet 340 without puncturing it with fasteners. For example, the depth, $D_{Slot}$, may be chosen from the range of 0.5 to 4 inches with some embodiments using depths, $D_{Slot}$, of 2 inches. Protruding portions or flags 348 are defined between the sides of the slots 349, and the flags 348 may be allowed to extend out a distance from outer sides of the edge retention assemblies to provide a surface for applying a clamping force onto the film/sheet 340 to allow additional tensile forces or adjusting/aligning forces to be applied along the length of the edge 346 (or edge 344) at spaced apart distances (and each of these forces may differ (or be the same)). The notches or slots 349 are used to allow, in some cases, the maximum amount of pressure to be applied by the edge retention assemblies onto the edges 344, 346 of the sheet/film 340 without puncturing it with fasteners.

Figure 5:
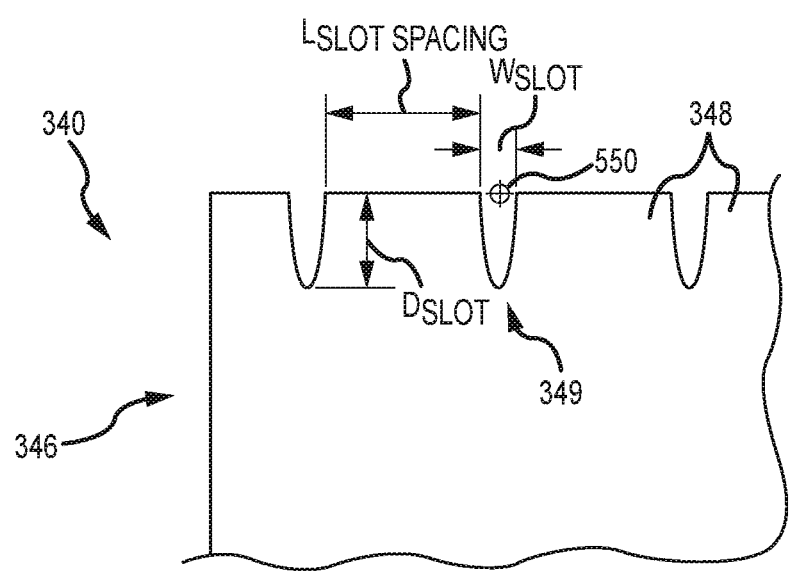
FIG. 5 is a detail view of the reflective element taken from FIG. 4 showing more details of the slots/recesses providing a serrated tension adjustment edge for the reflective element.

FIG. 5 is a detail view of the reflective element 340 taken from FIG. 4 and showing more details of the slots/recesses 349 that in combination provide a serrated tension adjustment edge 346 for the reflective element 340. The recesses/slots 349 are shown to have a depth, $D_{Slot}$, and to be spaced apart a distance, $L_{Slot\ Spacing}$, from each other as measured between adjacent sides/edges such as a spacing of 2 to 8 inches with a spacing between 3 and 4 inches used in some embodiments to provide adequately strong flags 348 and provide desired spacing (closeness) of fasteners of an edge retention assembly that pass through the slots 349 when the sheet/element 340 is placed in a tensioning assembly. The slots 349 are shown to have a center 550 at the outer side of the edge 346 (e.g., each slot 349 is a half oval/ovoid), and the slots/recesses 349 are shown to be ovoid/oval in shape with a relatively narrow width, $W_{Slot}$ (e.g., of 0.5 to 1.5 inches or the like) to limit material removal. The recesses 349 may take a variety of shapes to practice the invention such as a hemisphere, a triangle, or the like. However, the inventors have found/proven that an oval/ovoid shape (e.g., as shown in FIG. 5) is useful in many situations to allow limited material to be removed while also allowing material to be removed (e.g., the slot cut/formed) with edges or surfaces that are smooth as practical to avoid tearing of the material of the reflective element 340. To reduce the risk of damaging the edge 346, useful techniques for forming the serrated edge 346 are described below.

Figure 6:
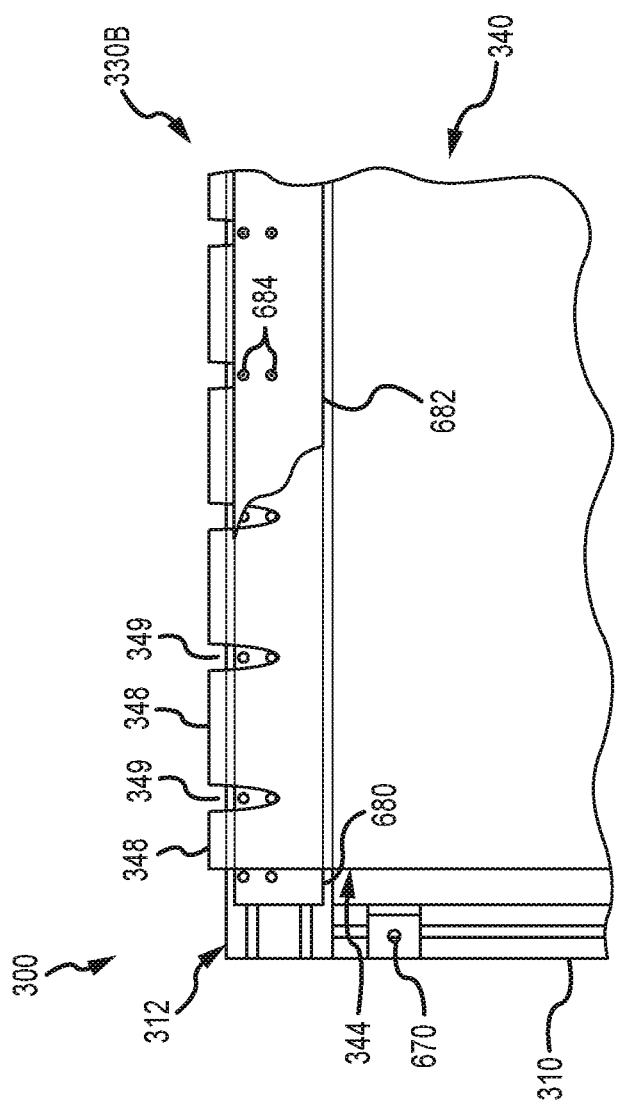
FIG. 6 is a detail view of the tensioning assembly taken from FIG. 3C showing details of retention of the reflective element (e.g., PET or BoPET film) by one edge retention assembly.

FIG. 6 is a detail view of the tensioning assembly 300 taken from FIG. 3C showing details of retention of the stationary end 344 of the reflective element (e.g., PET or BoPET film) 340 by one edge retention assembly 330B (more details of the assembly 330B which may be configured similar to assembly 330A are provided below). As shown, the edge retention assembly 330B includes a pair of sandwiching members or capture plates 680 and 682. The inner plate 680 is affixed to the end frame arm 312, which in turn is mated with the side frame arm 310. A side tensioning assembly 670 is shown to include side frame arm 310 (and a similar assembly would be provided on the opposite arm 310) and may include brackets and other components used for applying and adjusting side tension on the retained reflective element 340.

As shown in FIG. 6, the edge 344 of the reflective element 340 is positioned (or "sandwiched") between the inner plate 680 and the outer plate 682. The two plates 680, 682 are then attached to each other with fasteners (e.g., screws) 684 that are tightened so as to apply a compressive force on the edge 344 of the reflective element 340 to retain the reflective element 340 within the edge retention assembly 330B. The edge 344 is arranged such that the slots or recesses 349 are positioned near holes in the inner plates 680 and 682 to allow the fasteners 684 to extend through both plates 680 and 682 as well as through the film/sheet 340 without puncturing/ripping the material in the edge 344.

As shown, the tags or protruding portions 348 extend outward a distance from the sides of both plates 680, 682 to allow for fine tuning of tension being applied on the reflective element 340 at the location of each tag/portion 348 such as with manual application of a tensile force prior to tightening adjacent pairs of screws 684 on either side of a flag/portion 348. Without the use of the slots/recesses 349, this localized fine tuning of tension along the edge 344 would not have been possible. Lateral adjustments can also be performed along the length of edge 344 via lateral forces on the flags/portions 348 as the fasteners 684 typically have an outer diameter that is some amount (e.g., 0.125 to 1 inch) less than the inner dimensions of the slots/recesses 349 through which they pass.

Figure 7:
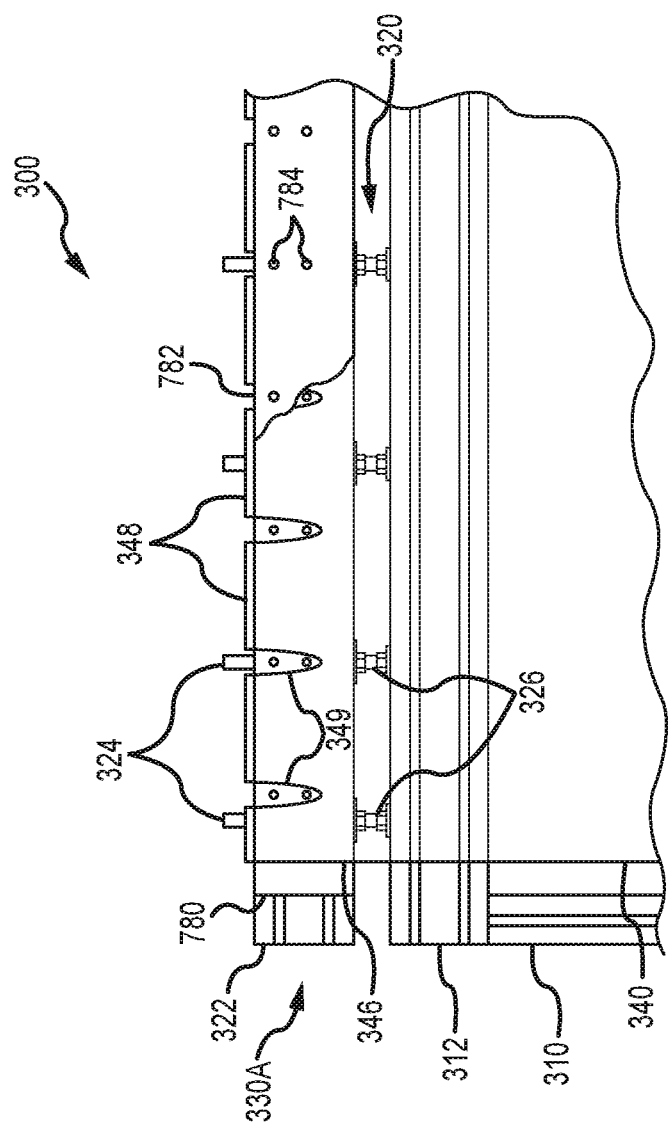
FIG. 7 is a detail view of the tensioning assembly taken from FIG. 3C showing details of retention of the reflective element by another one of the edge retention assemblies and also showing components of the tension adjuster.

FIG. 7 is a detail view of the tensioning assembly 300 taken from FIG. 3C showing details of retention of tension adjusting edge 346 of the reflective element 340 by the first edge retention assembly 330A and also showing components of the tension adjuster 320. As shown, the edge retention assembly 330A includes sandwiching members or plates 780 and 782 and the edge 346 of the reflective element 340 is positioned between (is "sandwiched" between) these two plates 780 and 782. The inner plate 780 is affixed to the tensioning beam or rod 322, and fasteners 784 are used to squeeze the two plates together to capture (apply compressive forces to) the edge 346 of the reflective element 340 and also attach the edge 346 to the tensioning beam or rod 322.

Slots or recesses 349 with an oval shape are provided in the edge 346 so that it is serrated and to provide slots/spaces through which the fasteners 784 mating the two plates 780, 782 may pass without puncturing the reflective element 340. Again, flags/portions 348 in the edge 346 extend between adjacent pairs of the slots 349, and their outer sides may extend outward a distance (e.g., 0.5 to 2 inches) beyond the outer sides of the plates 780, 782 to allow localized fine tuning of tension (applying tension by pulling upon a particular flag 748) or laterally adjusting alignment (along the length of the edge 346).

The tension adjuster 320 is shown to include the fasteners (e.g., threaded rods, cap screws, or the like) 324 that are used to mount the tensioning beam or rod 322 to the end frame arm 312 while allowing the gap or space between these two components to be adjusted at the location of each of these fasteners 324 along the length of the beam/rod 322. To this end, nuts or other coupling components 326 are provided on the fasteners 324 that can be rotated to modify the magnitude of this gap or space, and this changing of the position of the tension adjusting beam or rod 322 acts to modify the amount of tensile force being applied (or tension) at the locations of the fasteners 324 along the beam/rod 322. As discussed above, the space between the fasteners 324 may be varied to practice the tension adjuster 320 with the range of 2 to 12 inches being useful and one prototype using 6 inch spacing along the beam/rod 322.

Figure 8:
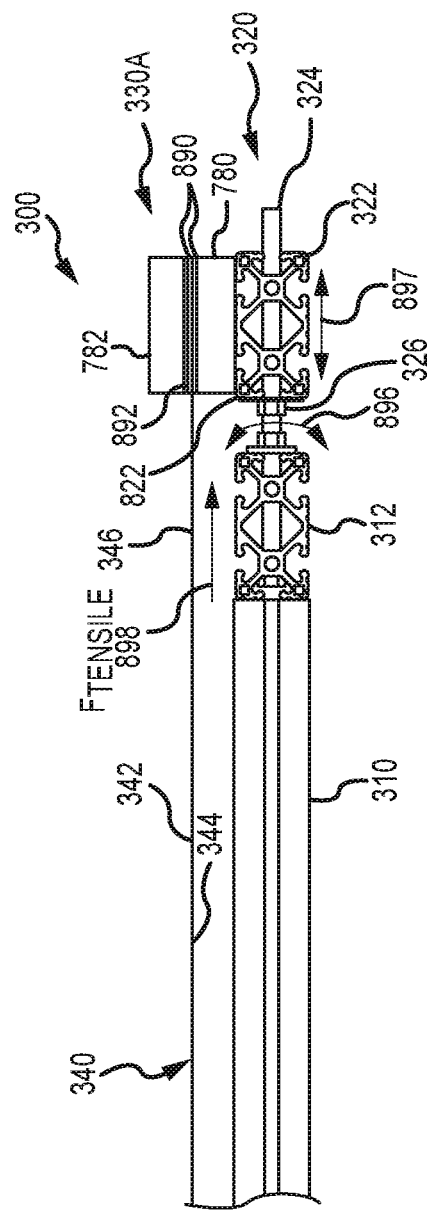
FIG. 8 is a side view of the tensioning assembly detail shown in FIG. 7 providing further detail of the edge retention assembly and of the tension adjuster.

FIG. 8 is a side view of the detail view of the tensioning assembly 300 shown in FIG. 7 providing further detail of the edge retention assembly 330A and of the tension adjuster 320. As can be seen better from this view, the side frame arm 312 and the tensioning beam/rod 322 of the tension adjuster 320 are formed of a channel material such as T-shaped aluminum channel from 80/20® Inc. or the like, which is lightweight, rigid with high strength, and adapted for easy coupling and/or assembly with fasteners. In this regard, the fasteners 324 of the tension adjuster 320 may take the form of cap screws or bolts (e.g., with a bolt head that can be countersunk in the channel-style arm 312). Then a nut (e.g., a steel hex nut) or other coupler 326 can be provided on the bolt/screw 324 between the frame arm 312 and the tensioning beam/rod 322 (optionally with a washer 827 to abut the side of the tensioning beam 322 to better distribute the applied load).

During tensioning processes, the nut/coupler 827 can be rotated as shown with arrow 896 causing the tensioning beam 322 to move toward or away from the side arm 312 as shown with arrow 897. The tensioning edge 346 (which is serrated as discussed above) of the reflective element 340 is captured/retained by the edge retention assembly 330A, which is affixed to the tensioning beam/rod 322 so as to cause the edge 346 to move with the tensioning beam/rod 322. This movement 897 caused by rotation of nut/coupler 827 adjusts the tensile force (tension) as shown with arrow 898 applied at or near the location of the fastener 324 along the tensioning beam to the reflective element 340. In this way, the tension in the reflective element 340 can be effectively adjusted along the length of its tensioning edge 346 to achieve a desired result, e.g., a tautness that causes the element's surfaces 342, 344 to be planar (or substantially planar) to be useful within a Pepper's ghost system or other projector/display system (such as system 100 of FIG. 1).

The edge retention assembly 330A may take a number of forms to practice the system 300, but, typically, it will include two clamping plates (inner and outer plates) 780 and 782 that are used to apply retention or compressive forces on the serrated edge 346 of the reflective element disposed or sandwiched between these plates 780 and 782. Fasteners or screws (as shown in FIG. 7) that pass through the slots/recesses in the edge 346 are used to force the two plates 780, 782 together to capture the reflective element's edge 346. To assist in capturing the edge 346 without damaging the element 340, the edge retention assembly 330A may further include a pair of adhesive strips 890 on either side of the serrated edge 346 between the two plates 780, 782, and these strips 890 may take the form of foam tape with adhesive on both sides (e.g., 3M's VHB foam tape or the like). Further, one or more cushioning or compressive layers 892 (e.g., neoprene or similar material strips (with or without adhesive on one or both sides) with a width matching that of the plates 780, 782) may also be sandwiched between the plates 780, 782 to distribute the load and provide a protective barrier between the hard (e.g., metal) surfaces of the plates 780, 782.

Figure 9:
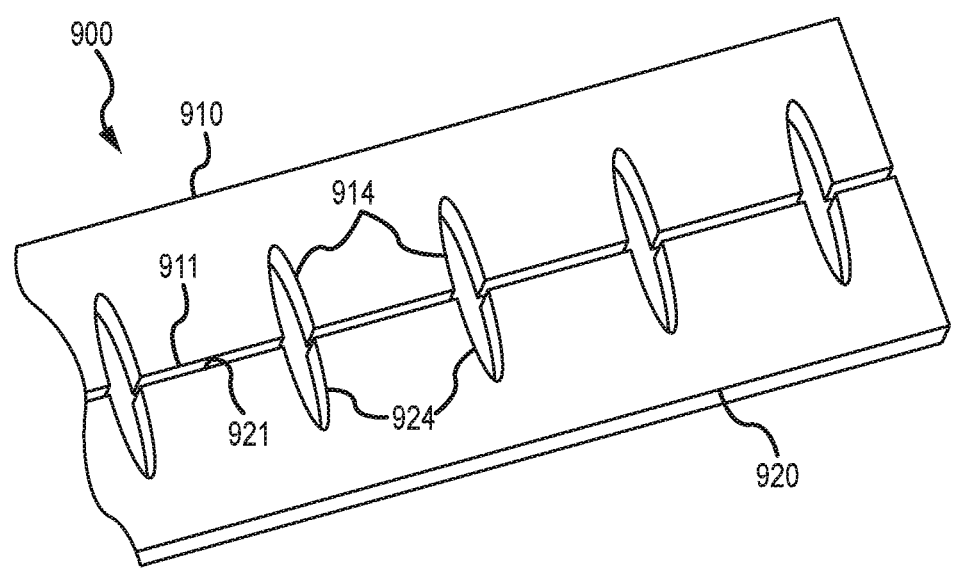
FIGS. 9 and 10 illustrate, respectively, a jig, for forming slots/recesses in a reflective element edges, in its opened and closed states.
Figure 10:
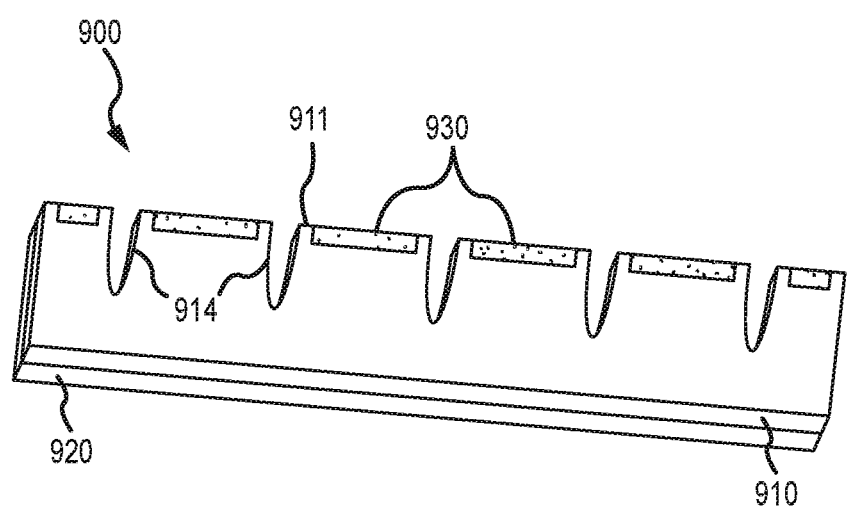

FIGS. 9 and 10 illustrate, respectively, a jig 900, for forming slots/recesses in a reflective element edges, in its opened and closed states. As mentioned above, it is desirable to form the slots or recesses to serrate an edge of a reflective element (e.g., a sheet of Mylar® or PET) to provide spaced apart locations for fasteners for the edge retention assembly's retainer plates, and it is preferable to remove the material in a manner that is smooth to avoid ripping of the sheet/film during later tensioning steps. These goals are furthered through the use of the jig 900 and also through the choice of ovoid or half-oval-shaped slots or recesses as these remove less material than a semicircular shape while providing smooth edges.

The jig 900 includes top and bottom sides or jig elements 910, 920 that are elongated, rectangular, and planar members with a width greater than the length of slots/recesses and a length adequate to include two, three, or more slots so the jig may only need to be moved several times to form a serrated edge. As shown in FIG. 9, the top jig element 910 includes a first side or edge 911 in which a plurality of spaced-apart slots/recesses 914 are provided with their shape, size, and spacing selected to define (match) the desired pattern of slots/recesses to be cut in a reflective element edge. Likewise, the bottom jig element 920 includes a first side or edge 921 in which a plurality of spaced-apart slots/recesses 924 are provided, with their shape, size, and spacing matching those in the top jig element 910. FIG. 9 illustrates the jig 900 in its opened state.

Figure 11:
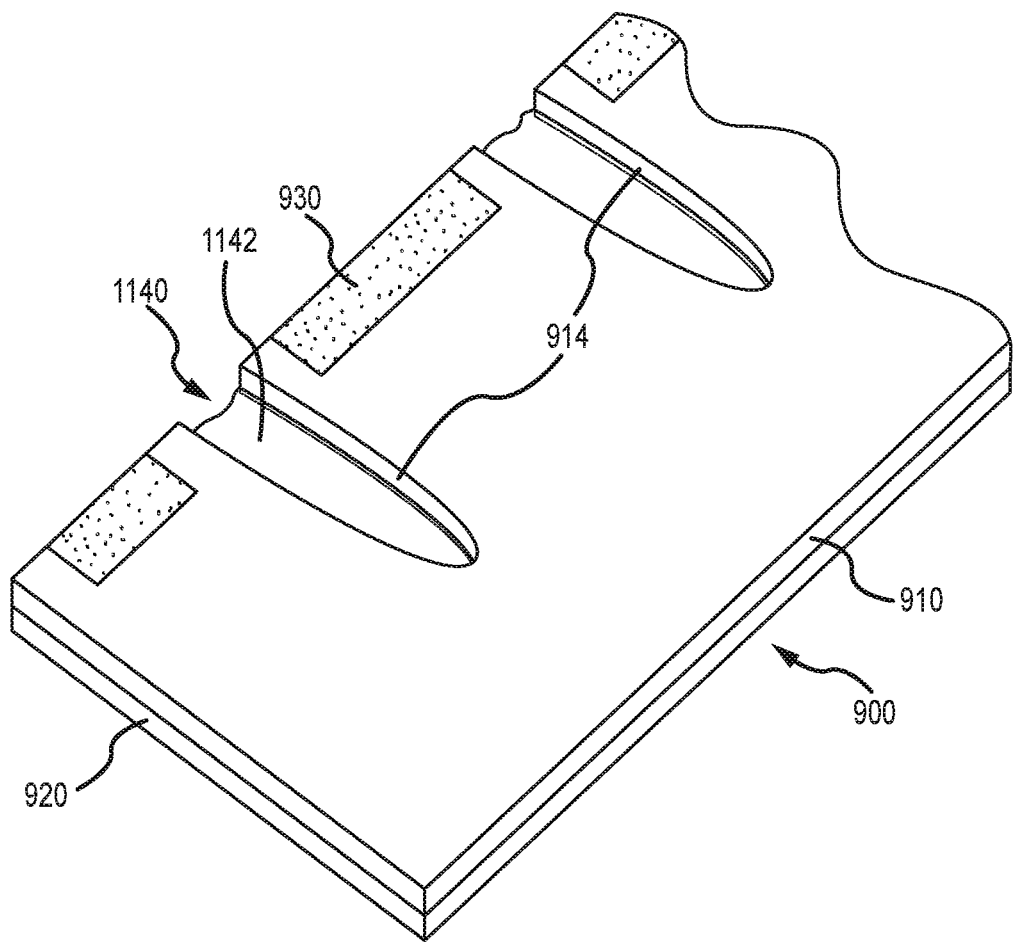
FIG. 11 illustrates the jig in its closed state with an edge of a reflective element (e.g., sheet of Mylar® or the like) sandwiched between the two side members of the jig prior to cutting out (or forming) the slots to form a serrated edge.

FIG. 10 illustrates the jig 900 in its closed state (without insertion of an edge of a reflective element). As shown in FIG. 10, the jig 900 includes a set of hinges 930 along or adjacent to the first edges 911, 921 and provided in spaces between the slots/recesses 914, 924. The hinges 930 allow the top and bottom jig elements 910, 920 to be pivoted away from each other in the open state so as to be able to receive an edge of a reflective element and then to be pivoted about their sides 911, 921 toward each other to sandwich a received edge of a reflective element. This can be seen in FIG. 11, which shows the jig 900 in a closed state with top jig element 910 positioned on top of (pressing down on) an edge of a reflective element 1140 (e.g., a sheet of polyester, PET, BoPET, or the like). The jig 900 in FIG. 11 is shown prior to any material removal or "cutting" steps are performed such that a portion 1142 of the edge of the reflective element 1140 to be removed to form a slot based on the slots 914 in the top jig element 910 is still visible (or present).

FIG. 12 illustrates a cutting (or material removal) step that is being performed by an operator 1205 as part of a process of forming a reflective element with at least one serrated edge (e.g., the tension adjusting edge) 1246. As shown, the operator 1205 has already used the jig 900 along with a cutting tool 1250. In FIG. 12, a heated knife is shown as the tool 1250, but the cutting tool 1250 could take other forms useful for cutting and "sealing" (or eliminating rough edges that may lead to a tear) the material of the sheet 1140 such as a laser-based tool, a heated die, and the like. The combined use of the jig 900 and tool 1250 has allowed the operator 1205 to cut a plurality of identical (or nearly identical) slots 1249 with an ovoid shape (in this example) with flags or portions of the material 1248 extending there between in the now serrated edge 1246 of the sheet/film 1240 that once completed can be used as a reflective element.

FIG. 12 shows the operator 1205 performing a next cutting step in which the jig 900 has been moved down to a new section of the edge 1246 and clamps are being used to hold the jig 900 in its closed position (e.g., with the hinges 930 abutting the outer side of the edge 1246 to align the jig 900 along the length of the new section of the sheet/film 1140). With the jig 900 clamped in place and the new section captured and retained in the closed jig 900, the operator 1205 can use the cutting tool 1250 to follow the slots/recesses 914 in the jig 900 to remove material from the edge 1246 so as to form the desired pattern of spaced-apart and repeating slots/recesses 1249 in the new or retained section of the sheet/film 1140. Once all slots 1249 are cut, the jig 900 can be opened and moved to any remaining sections of the edge 1246 to provide the serrations along the entire length of the edge 1246.

FIG. 13 illustrates a tension adjusting step being completed as part of a process of tension adjustment for a reflective element in a tensioning assembly, such as may be used within a Pepper's ghost or display/projection system of the present description. As shown, a serrated edge 1346 of a reflective element (e.g., a sheet of Mylar® or the like) is being sandwiched and at least partially retained by an edge retention assembly. This assembly is shown to include a first retention plate 1380 and a second retention plate 1386, and the edge 1346 is positioned between these two plates 1380, 1386. Fasteners (e.g., screws) 1382 are being used (with washers 1383) to pull the two plates together and retain the edge 1346.

The edge 1346 is shown to be serrated with flags or protruding portions 1348 between spaced-apart slots/recesses 1349. As shown, the fasteners 1382 extend through slots/recesses 1349 so as to not puncture the material of the edge 1346 so as to reduce the risk of tearing during the tension adjustment process. Clamps 1350 are placed on opposite sides of a pair of the fasteners 1382 passing through a particular slot/recess 1349 (or this could be characterized as being on opposite sides of the slot/recess 1349). Then, the fasteners 1382 can be rotated/loosened to move the plate 1380 away from the plate 1386 to allow movement of the portion of the edge 1346 near the slot 1349 to locally adjust tension in the sheet/film and/or to laterally adjust alignment along the length of the edge 1346.

Additional clamps 1356 can then be attached to one or more of the flags/protruding portions 1348 adjacent the particular slot 1349, and force can be applied by an operator via the clamps 1356 to apply the tension adjusting forces and/or aligning forces. Once adjustments are complete, the fasteners 1382 can be tightened to apply compression/retention forces on the sandwiched material of the edge 1346 near the slot 1349 and the clamps 1350, 1356 can be moved to a new location along the edge 1346 to provide additional localized adjustment of tension or alignment.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the edge retention assembly and attached tensioning bar may be provided in two, three, four, or more sections rather than in single, unitary pieces. This would allow different tensioning forces to be applied across sections of the tension adjustment edge rather than affecting tensioning at each fastener but with a unitary tensioning beam/rod as shown in the exemplary figures. Also, each side of 300 can include these tension bars to provide even more tension options.

In some embodiments, the edge retention assemblies may be configured to utilize magnetic plates (or a magnetic frame) rather than using fasteners to compress two sandwiching plates as shown. A pair of elongated magnets may be used to replace each of the plates shown in the figures to retain a serrated or non-serrated edge of a reflective element, and one of these magnetic members would be attached to the tensioning beam/rod to move with this beam/rod to apply tensile forces. As discussed above, other embodiments may use a set of pairs of magnetic plates so as to allow tensile forces to be applied to sections of the tension adjusting edge. The magnets or magnetic clamping may be passive (e.g., neodymium magnets to ferrous metal) or active (e.g., neodymium passive bar that meets with a ferrous plat and coil that is uncharged to hold then charged to release or the like).

In other embodiments, a series of hold-down clamps or other clamp designs may be used in the edge retention assemblies to retain an edge of the reflective element, with a portion of each clamp affixed to the tensioning beam of the tension adjuster (and the tensioning beam may be divided into sections or subparts to allow localized application of tensions as noted above). These clamps may be provided using spring clamps and/or toggle clamps. In other embodiments, the edge may be retained using adhesives. In other cases, Velcro (e.g., military grade Velcro or the like) or similar materials may be used such as to pull the reflective element around a box frame (e.g., a steel or other metal frame). In still other cases, the reflective element may be formed of a material that is susceptible to shrinking when heated, and, hence, heat shrinking may be used to provide proper tensioning of the reflective element used alone or in conjunction with the other tensioning processes/techniques described herein.

Although not shown, another embodiment of a tensioning assembly would include a reflective element with a tension adjustment edge that includes a plurality of spaced apart connectors extending outward from the side of the sheet of Mylar, PET, or other material. For example, the connectors may take the form of polyester (or other material compatible with the reflective element material) straps that are welded (or otherwise attached) to the tension adjusting film. These straps may include loops or eyelets at the end distal to the end of the strap affixed to the tension adjusting edge, and the straps may be spaced apart along the edge at a predefined spacing (such as for the fasteners in the tension adjuster described in the figures), e.g., 4 to 12 inches or the like with some embodiments using 6-inch spacing, to allow localized tensile forces to be applied at each location of one of these straps/connectors. In such embodiments, the tension adjuster may be modified to include a set of turnbuckles or other force-application components attached along a support beam/rod. Each of these turnbuckles may be coupled with one of the straps/connectors, and operation of each turnbuckle may be used to apply a tensile force to the edge of the reflective element (and also used to retain the edge in the tensioning assembly).

We claim:

1. An apparatus for projecting or displaying images to a viewer in a viewing space, comprising:
   a projection assembly projecting an image stream; and
   a tensioning assembly supporting a reflective element comprising a sheet of flexible material with a first surface receiving and reflecting a portion of light associated with the image stream to the viewer and a second surface opposite the first surface,
   wherein the tensioning assembly includes first and second edge retention assemblies retaining, respectively, a first edge of the reflective element and a second edge of the reflective element opposite the first edge,
   wherein the tensioning assembly includes a tension adjuster operable to separately apply a tensile force at a plurality of space apart location along the first edge of the reflective element, whereby the sheet is taut and the first and second surfaces are planar, and
   wherein the first edge of the reflective element is serrated.

2. The apparatus of claim 1, wherein the serrated first edge comprises a plurality of spaced apart slots.

3. The apparatus of claim 2, wherein the slots each are shaped as a partial oval.

4. The apparatus of claim 2, wherein the first edge retention assembly includes a pair of retention plates, wherein the first edge is sandwiched between the retention plates, and wherein the first edge retention assembly further includes fasteners coupling the first and second plates and extending through the slots in the first edge.

5. The apparatus of claim 4, wherein the serrated first edge comprises a plurality of protruding portions between each adjacent pair of the slots and where each of the protruding portions extends outward a distance from an outer side of each of the retention plates.

6. The apparatus of claim 4, wherein the tensioning assembly further comprises a frame with at least first and second frame arms, wherein the tension adjuster comprises a tensioning beam rigidly attached to the first plate of the first edge retention assembly and coupled to the first frame arm with a fastener assembly comprising a plurality of spaced apart fasteners, and wherein the fastener assembly is operable to adjust spacing between the first frame arm and the first plate at each of the fasteners, whereby a tensile force applied to the reflective element is adjustable along the first edge at locations of each of the fasteners.

7. The apparatus of claim 6, wherein the tensioning beam and first plate each comprise a plurality of separate sections that are independently positionable within the tensioning assembly.

8. The apparatus of claim 1, wherein the first and second edge retention assemblies each comprises a pair of elongate magnetic members and the first edge is sandwiched between the magnetic members.

9. The apparatus of claim 1, wherein the first edge includes a plurality of spaced apart straps affixed to the first edge and extending outward from the sheet and wherein the tension adjuster comprises a plurality of force application components each connected to one of the straps and operable to apply a localized tensile force to the sheet via the connected one of the straps.

10. An apparatus for providing a reflective and transmissive optical element for use in providing a Pepper's ghost display, comprising:
   a reflective element comprising a sheet of flexible material; and
   first and second edge retention assemblies retaining, respectively, a first edge of the sheet and a second edge of the sheet opposite the first edge, wherein the first edge of the reflective element is serrated with a plurality of spaced-apart slots, wherein the first edge retention assembly includes a pair of retention plates, wherein the first edge is sandwiched between the retention plates, and wherein the first edge retention assembly further includes fasteners coupling the first and second plates and extending through the slots in the first edge.

11. The apparatus of claim 10, wherein the slots each are shaped as a partial oval.

12. The apparatus of claim 10, wherein the serrated first edge comprises a plurality of protruding portions between each adjacent pair of the slots and where each of the protruding portions extends outward a distance from an outer side of each of the retention plates.

13. The apparatus of claim 10, wherein the tensioning assembly further comprises a frame with at least first and second frame arms and tension adjuster, wherein the tension adjuster comprises a tensioning beam rigidly attached to the first plate of the first edge retention assembly and coupled to the first frame arm with a fastener assembly comprising a plurality of spaced apart fasteners, and wherein the fastener assembly is operable to adjust spacing between the first frame arm and the first plate at each of the fasteners, whereby a tensile force applied to the reflective element is adjustable along the first edge at locations of each of the fasteners.

14. The apparatus of claim 13, wherein the tensioning beam and first plate each comprise a plurality of separate sections that are independently positionable within the tensioning assembly.

15. An apparatus for projecting or displaying images to a viewer in a viewing space, comprising:
   a projection assembly projecting an image stream; and
   a tensioning assembly supporting a reflective element comprising a sheet of flexible material with a first surface receiving and reflecting a portion of light associated with the image stream to the viewer and a second surface opposite the first surface,
   wherein the first edge of the reflective element is serrated with a plurality of spaced-apart slots,
   wherein the tensioning assembly includes first and second edge retention assemblies retaining, respectively, a first edge of the reflective element and a second edge of the reflective element opposite the first edge,
   wherein the tensioning assembly includes a tension adjuster,
   wherein the tensioning assembly further comprises a frame with at least first and second frame arms,
   wherein the tension adjuster comprises a tensioning beam coupled to the first frame arm with a fastener assembly comprising a plurality of spaced apart fasteners, and
   wherein the fastener assembly is operable to adjust spacing between the first frame arm and the first plate at each of the fasteners, whereby a tensile force applied to the reflective element is adjustable along the first edge at locations of each of the fasteners.

16. The apparatus of claim 15, wherein the tensioning beam is rigidly attached to the first plate of the first edge retention assembly.

17. The apparatus of claim 15, wherein the slots each are shaped as a partial oval.

18. The apparatus of claim 15, wherein the first edge retention assembly includes a pair of retention plates, wherein the first edge is sandwiched between the retention plates, and wherein the first edge retention assembly further includes fasteners coupling the first and second plates and extending through the slots in the first edge.

19. The apparatus of claim 18, wherein the serrated first edge comprises a plurality of protruding portions between each adjacent pair of the slots and where each of the protruding portions extends outward a distance from an outer side of each of the retention plates.

20. An apparatus for projecting or displaying images to a viewer in a viewing space, comprising:
   a projection assembly projecting an image stream; and
   a tensioning assembly supporting a reflective element comprising a sheet of flexible material with a first surface receiving and reflecting a portion of light associated with the image stream to the viewer and a second surface opposite the first surface,
   wherein the tensioning assembly includes first and second edge retention assemblies retaining, respectively, a first edge of the reflective element and a second edge of the reflective element opposite the first edge,
   wherein the tensioning assembly includes a tension adjuster operable to separately apply a tensile force at a plurality of space apart location along the first edge of the reflective element, whereby the sheet is taut and the first and second surfaces are planar, and
   wherein the first and second edge retention assemblies each comprises a pair of elongate magnetic members and the first edge is sandwiched between the magnetic members.

21. The apparatus of claim 20, wherein the first edge of the reflective element is serrated and wherein the serrated first edge comprises a plurality of spaced apart slots.

22. The apparatus of claim 21, wherein the slots each are shaped as a partial oval.

23. The apparatus of claim 21, wherein the first edge retention assembly includes a pair of retention plates, wherein the first edge is sandwiched between the retention plates, and wherein the first edge retention assembly further includes fasteners coupling the first and second plates and extending through the slots in the first edge.

24. The apparatus of claim 23, wherein the serrated first edge comprises a plurality of protruding portions between each adjacent pair of the slots and where each of the protruding portions extends outward a distance from an outer side of each of the retention plates.

25. The apparatus of claim 23, wherein the tensioning assembly further comprises a frame with at least first and second frame arms, wherein the tension adjuster comprises a tensioning beam rigidly attached to the first plate of the first edge retention assembly and coupled to the first frame arm with a fastener assembly comprising a plurality of spaced apart fasteners, and wherein the fastener assembly is operable to adjust spacing between the first frame arm and the first plate at each of the fasteners, whereby a tensile force applied to the reflective element is adjustable along the first edge at locations of each of the fasteners.

26. The apparatus of claim 25, wherein the tensioning beam and first plate each comprise a plurality of separate sections that are independently positionable within the tensioning assembly.

27. The apparatus of claim 20, wherein the first edge includes a plurality of spaced apart straps affixed to the first edge and extending outward from the sheet and wherein the tension adjuster comprises a plurality of force application components each connected to one of the straps and operable to apply a localized tensile force to the sheet via the connected one of the straps.

* * * * *